United States Patent [19]

Chiang

[11] Patent Number: 4,904,896

[45] Date of Patent: Feb. 27, 1990

[54] VACUUM ELECTRON TUBE HAVING AN OXIDE CATHODE COMPRISING CHROMIUM REDUCING AGENT

[75] Inventor: Kenneth K. T. Chiang, Lancaster, Pa.

[73] Assignee: RCA Licensing Corporation, Princeton, N.J.

[21] Appl. No.: 675,226

[22] Filed: Nov. 27, 1984

[51] Int. Cl.[4] .................................................. A01J 1/20

[52] U.S. Cl. ................................ 313/337; 313/346 R; 313/270

[58] Field of Search .................... 313/337, 346 R, 270, 313/446, 37, 45, 451, 456

[56] References Cited

U.S. PATENT DOCUMENTS

| | | | |
|---|---|---|---|
| 3,351,486 | 11/1967 | Buescher et al. | 117/223 |
| 3,432,900 | 3/1969 | Kerstetter | 29/25.17 |
| 3,919,751 | 11/1975 | Buescher et al. | 29/25.18 |
| 3,958,146 | 5/1976 | Buescher et al. | 313/346 R |
| 4,009,409 | 2/1977 | Buescher et al. | 313/337 |
| 4,184,100 | 1/1980 | Takanashi et al. | 313/270 |
| 4,370,588 | 1/1983 | Takahashi et al. | 313/270 |
| 4,376,009 | 3/1983 | Kunz | 156/640 |
| 4,388,551 | 6/1983 | Ray | 313/346 |

FOREIGN PATENT DOCUMENTS

| | | | |
|---|---|---|---|
| 768916 | 2/1957 | United Kingdom . | |
| 1076229 | 7/1967 | United Kingdom . | |
| 51-62655 | 5/1976 | Japan | 313/346 R |
| 0367100 | 8/1976 | Japan | 313/346 R |
| 0090750 | 8/1978 | Japan | 313/337 |
| 0119662 | 10/1978 | Japan | 313/337 |
| 0152957 | 12/1979 | Japan | 313/346 R |
| 0046438 | 3/1982 | Japan | 313/346 R |
| 0084543 | 5/1982 | Japan | 313/346 R |
| 0018537 | 1/1984 | Japan | 313/346 R |
| 0105234 | 6/1984 | Japan | 313/337 |

OTHER PUBLICATIONS

A. M. Bounds et al., "Nickel Alloys for Oxide-Coated Cathodes," *Proceedings of the I.R.E.*, 39, 788–799 (1951).

*Primary Examiner*—Leo H. Boudreau
*Assistant Examiner*—Michael Razavi
*Attorney, Agent, or Firm*—Joseph S. Tripoli; Dennis H. Irlbeck; Vincent J. Coughlin, Jr.

[57] ABSTRACT

In a vacuum electron tube, a novel oxide cathode comprising a metal substrate, means for heating said substrate to its operating temperature, and a layer of alkaline-earth-metal oxide on the substrate. The substrate is essentially free from silicon and contains operative concentrations greater than 1.0 weight % of chromium metal for progressively migrating into the oxide layer and reducing the oxide to yield alkaline-earth-metal.

13 Claims, 1 Drawing Sheet

VACUUM ELECTRON TUBE HAVING AN OXIDE CATHODE COMPRISING CHROMIUM REDUCING AGENT

This invention relates to a vacuum electron tube comprising a novel oxide cathode. The novel oxide cathode may be used in an electron tube, such as a vacuum diode, a vacuum triode, or a cathode-ray tube.

BACKGROUND OF THE INVENTION

Most vacuum electron tubes employ at least one thermionic oxide cathode as a source of electrons. A typical cathode comprises a nickel metal substrate, a layer consisting essentially of barium oxide and one or more other alkaline earth oxides on one surface of the substrate, and means for maintaining the operating temperature of the substrate at about 950° to 1100° K. opposite the other surface. The substrate contains minor amounts of reducing agents which progressively migrate at different rates into the oxide layer at the operating temperature and reduce the barium oxide in the oxide layer to barium metal. The barium metal produces a low work function surface on the oxide layer for the efficient emission of electrons at the operating temperature. An article by A. M. Bounds et al. entitled, "Nickel Alloys for Oxide-Coated Cathodes," *Proceedings of the I.R.E.*, 39 788–799 (1951), discloses that the commonly-used reducing agents in the substrate are elemental aluminum, carbon, magnesium, manganese, silicon, titanium and tungsten.

Minor amounts of elemental silicon are alloyed with nickel in the substrates of all commercial oxide cathodes, even though a resistive interfacial layer of barium orthosilicate is known to form between the substrate and the oxide layer during the operation of the cathode. To limit the formation of this interfacial layer and thereby extend the life of the cathode, the concentration of silicon in the substrate is usually less than 0.1 weight percent and never more than 0.25 weight percent. The other reducing agents mentioned above are similarly limited in concentrations in the substrate.

Chromium metal, which has been reported as a reducing agent, is never intentionally present in significant quantities in the substrate because it is reported to form a heavy black interfacial layer between the substrate and the oxide layer which interferes with the operation of the cathode, and because it is believed that chromium metal sublimes too rapidly at the operating temperatures of oxide cathodes to be practical. U.S. Pat. No. 4,370,588 issued Jan. 25, 1983 to K. Takahashi also points out that chromium that is diffused into the oxide layer will shorten the emissive life of the cathode.

SUMMARY OF THE INVENTION

In the novel oxide cathode, the substrate is essentially free from concentrations of silicon which form resistive interfacial layers during the operation of the oxide cathodes, and contains chromium in concentrations greater than 1.0% weight percent, and usually about 5 to 20 weight percent, which are operative for progressively migrating to and reducing the oxide layer. Tests have demonstrated that the novel cathodes, when properly made, have long operating lives with little or no adverse effects from interfacial layers or rapid sublimation.

The novel oxide cathode is employed in a vacuum electron tube, such as a diode, triode or cathode-ray tube. As in prior oxide cathodes, the novel oxide cathode comprises a metal base or substrate, preferably of nickel metal, means for heating the cathode to, and maintaining the cathode at, its operating temperature, and an oxide layer consisting essentially of alkaline-earth-metal oxide on the base. Unlike prior oxide cathodes, the substrate is essentially free from silicon and contains operative proportions of chromium metal for progressively reducing the oxide to yield controlled amounts of alkaline earth metal in the oxide layer during the operating life of the cathode.

The novel cathode may be directly or indirectly heated. Elemental chromium may be present in the substrate prior to assembling the novel cathode, but is preferably introduced into the substrate by thermal migration from a contiguous source of chromium after assembling the novel cathode into an electron tube. Other reducing agents, such as elemental magnesium, may also be present in the substrate.

DETAILED DESCRIPTION OF THE PREFERRED EMBODIMENTS

Figure 1:
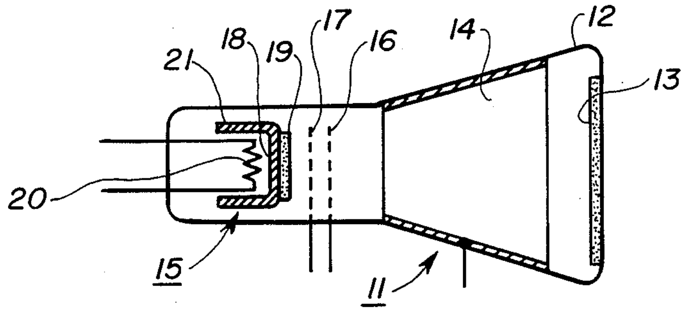
FIG. 1 is a symbolic representation of a cathode-ray tube comprising the novel cathode.

The novel oxide cathode is employed in a vacuum electron tube, such as a diode, a triode or a cathode-ray tube. The single-gun cathode-ray tube 11 shown symbolically in FIG. 1 comprises an evacuated glass envelope 12 having a luminescent screen 13 at one end, an anode 14 coated on its sides, an oxide cathode 15 at its other end, and beam-forming grids 16 and 17 between the cathode 15 and the anode. The cathode 15 comprises a substrate 18 carrying an oxide layer 19 on its outer surface, a resistance heater 20 opposite its inner surface, and a metallic sleeve 21 around the heater. The physical construction of the cathode 15 may be the construction shown in FIG. 3. The electron tube may include more than one cathode as is common for color display and entertainment tubes. Also, the substrate 18 and sleeve 21 may be one integral piece or may be two pieces that are welded together.

In each of the following embodiments, the novel oxide cathode consists essentially of a coating of triple (barium, strontium and calcium) carbonates, (Ba,Sr,Ca) $CO_3$, spray coated onto a substrate of nickel metal which contains minor amounts of reducing agents. One or more compounds which decompose upon heating to oxides of one or more alkaline earth metals including barium may be used in the coating. Unlike prior oxide cathodes, the substrate of the cathode is essentially free from silicon and contains more than 1.0 weight percent chromium metal as an essential reducing agent, although other reducing agents may be present. By "essentially free from silicon" is meant that any content of silicon does not function as a reducing agent for the oxide layer, and does not form an interfacial layer between the substrate and the oxide layer.

After the cathode is installed in a vacuum tube, the tube is thermally processed by energizing the heating means of the cathode, whereby carbonates of the coating decompose under the influence of the heat, producing an oxide layer on the substrate. Some purposes of the nickel substrate are to support the carbonate coating and oxide layer, to conduct heat to the carbonate coating and oxide layer, to conduct electric current to the oxide layer and to provide reducing agents that can thermally migrate to the oxide layer.

Electron emission from the novel cathode, as in prior oxide cathodes, depends on the presence of free barium metal in the oxide layer, which produces a low-work-function surface on the oxide layer. Reducing agents in the nickel substrate diffuse progressively into the oxide layer during thermal processing and during operating life of the cathode, and react with barium oxide, producing free barium metal and compounds of the reducing agent. The depletion and/or loss of mobility of the reducing agents in the substrate is a primary cause of the fall off of electron emission from the cathode with use.

In the novel oxide cathode, elemental chromium is present in the substrate in concentrations greater than 1.0 weight percent, and usually 5 to 20 weight percent. This is contrary to prior practice, which taught that chromium in any form is undesirable in an oxide cathode, and that even traces of chromium are to be avoided. Also, prior practice taught that the concentrations of reducing agents in the substrate should be carefully controlled to values not greater than 1.0 weight percent.

Undesirable effects resulting from the presence of chromium in the substrate have been confirmed. These undesirable effects are the result of the formation of chromium oxides at the interface between the substrate and the oxide layer, which results in poor adherence of the oxide layer to the substrate. However, when little or no chromium oxides are formed at that interface with a chromium-containing substrate, efficient oxide cathodes with long operating lives can be produced.

In the novel cathodes, chromium-oxygen bonds are suppressed or avoided, and the usual nickel-oxygen bonds are formed on the substrate surface prior to assembling the cathode. The usual nickel-oxygen-barium bonds are formed at the substrate-layer interface during thermal processing after the cathode is assembled into a vacuum electron tube. This can be achieved in several ways. A nickel-chromium alloy substrate can be carefully processed to suppress the formation of chromium-oxide bonds on the surface of the substrate.

By another method a cathode with a nickel substrate free from chromium can be assembled into a vacuum tube. Then, chromium from a contiguous source can be made to migrate into the substrate when the cathode is heated for at least 10 hours at about 1030° to 1080° K. in the usual way for operating the vacuum tube. Sufficient migration of chromium may require several weeks of operation of the cathode. Faster-acting reducing agents, such as elemental magnesium, may be present in the substrate to enhance electron emission by the cathode until sufficient concentrations of chromium have migrated into the substrate. FIGS. 2A to 2D are graphs showing the concentration profiles of chromium in a starting bonded bimetal about 3.0 mils thick consisting of 2.0-mil-thick nickel strip 22 and 1.0-mil-thick nichrome alloy (20% chromium - 80% nickel) strip 23 after heating at about 1050° K. for 0, 10, 500 and 1,000 hours respectively. This data shows that substantial amounts of chromium migrate to the external nickel surface 24 during the first 500 hours of operation of the cathode. After more than 1,000 hours of heating, the concentration of chromium in the nickel strip 22 averages about 6 weight %. If this surface carries an adherent oxide layer, then chromium atoms migrate by vapor transport to the oxide layer where they react with and reduce barium oxide to form elemental barium and barium chromate, by a reaction such as $$8\ BaO + 2\ Cr \rightarrow Ba_3(CrO_4)_2 + 5\ Ba.$$

At normal cathode operating temperatures of about 1030° to 1080° K., the vapor pressure of elemental chromium is about $5.0\times10^{-11}$ atoms Elemental barium is produced progressively, and relatively high levels of electron emission are maintained by the cathode over a long period of operation. The reaction products do not concentrate as an interfacial layer at the interface between the substrate and the oxide layer. In comparison, the vapor pressure of elemental silicon (which is present in all commercial oxide cathodes, but is specifically excluded in operative concentrations from the novel cathode) at the same temperature is about $4.7\times10^{-13}$ atoms, which is about 2 orders of magnitude lower. Elemental silicon in the substrate tends to form a resistive interfacial layer of barium orthosilicate at the interface between the substrate and the oxide layer.

Figure 2:
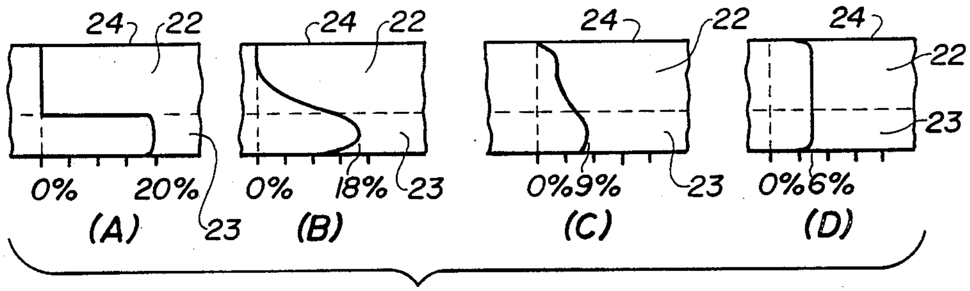
FIGS. 2A to 2D are a family of graphs representing the concentrations of chromium in a bimetal after 0, 10, 500 and more than 1,000 hours of heating at about 1050° K.
Figure 3:
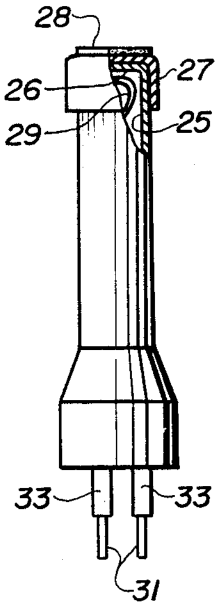
FIGS. 3, 4, 5 and 6 are partially broken-away elevational views of four different embodiments of the novel cathode

FIG. 3 shows a preferred first embodiment of the novel cathode. The substrate is prepared by the method disclosed in U.S. Pat. No. 4,376,009 issued Mar. 8, 1983 to P. J. Kunz. By that method a bimetal of one-mil-thick nichrome and two-mil-thick cathode nickel is drawn into a tube or sleeve 25 that is closed at one end by an endwall 26, and then the outer layer of cathode nickel is selectively etched, leaving a bonded substrate or cap 27 of nickel metal on the closed endwall and adjacent sidewall of the sleeve 25. In this case, the sleeve 25, which is the inner layer of the drawn bimetal, contains about 20 weight % chromium and about 80 weight % nickel. The cap 27 contains more than 95 weight % nickel and less than 5 weight of other constituents including about 0.1 weight % magnesium and 4.0 weight % tungsten. Neither layer contains any significant amount of silicon; that is, the silicon content is less than 0.001 weight %. The initial distribution of chromium in the bimetal is shown in FIG. 2A. An oxide layer 28 resides on the outer surface of the cap 27, and a heater 29 is located within the sleeve 25 with legs 31 extending out of the open end of the sleeve 25. The heater carries an electrically insulating coating 33 on its surfaces within the sleeve 25. After the substrate or cap 27 is drawn and etched, a coating of triple carbonates is sprayed on the endwall of the cap 27. Then, the cap and sleeve with the coating thereon are mounted in an electron tube. The resistance heater 29 is inserted into the sleeve 25, and the heater legs 31 are welded to electrical contacts (not shown). An insulating layer 33 resides on the surface of the heater 29. Assembly of the tube is completed, and then the tube is evacuated to low pressure and sealed. Then, voltage (ordinarily about 6.2 volts DC) is applied across the legs 31 causing the heater 29 to heat and raising the temperature of the substrate 27 to about 1050° K. Above 600° K., carbonates of the coating on the cap 27 decompose to form oxides forming an oxide layer, and the reducing agents in the cap 27 migrate over a period of time into the oxide layer and react, forming free elemental barium. Also, chromium in the endwall of the sleeve 25 migrates into the cap 27, as shown in FIGS. 2B, 2C and 2D, and finally into the oxide layer 28.

Figure 4:
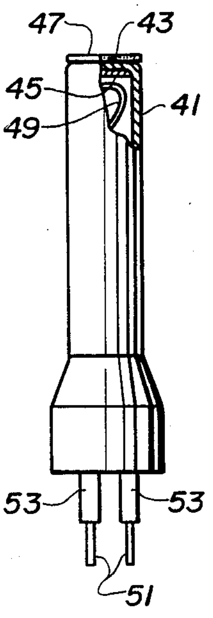

FIG. 4 shows a second embodiment of the novel oxide cathode. The substrate of two-mil-thick cathode nickel comprises a sleeve 41 closed at one end by an endwall 43. The inner surface of the endwall 43 carries a layer 45 of chromium metal, and the outer surface of the endwall 43 carries an oxide layer 47. A resistance heater 49 resides inside the sleeve 41 with the legs 51 thereof extending out of the open end of the sleeve. An insulating layer 53 is present on the heater 49. This second embodiment may be prepared in a manner similar to that described for the first embodiment.

Figure 5:
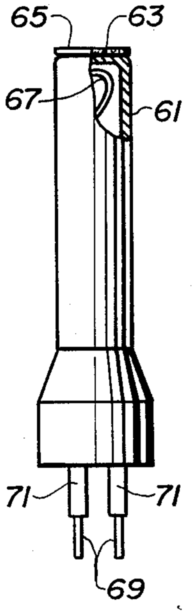

FIG. 5 shows a third embodiment of the novel oxide cathode. The substrate of one-mil-thick nichrome comprises a sleeve 61 closed at one end by an endwall 63, which functions as the substrate. The outer surface of the endwall 63 carries an oxide layer 65. A resistance heater 67 resides inside the sleeve 61 with the legs 69 thereof extending out of the open end of the sleeve 61. An insulating layer 71 is present on the heater 67. In preparing this embodiment, all oxides are removed from the external surface of the endwall 63 prior to depositing a triple-carbonates coating thereon. Then, throughout the subsequent processing, that surface is protected from oxidation. In so doing, chromium oxides are discouraged from forming. Subsequently, during thermal processing at elevated temperatures, nickel-oxygen-barium bonds are formed predominantly at the interface between the endwall 63 (substrate) and the oxide layer 65, thereby providing adequate bonding of the oxide layer 65 to the endwall 63.

Figure 6:
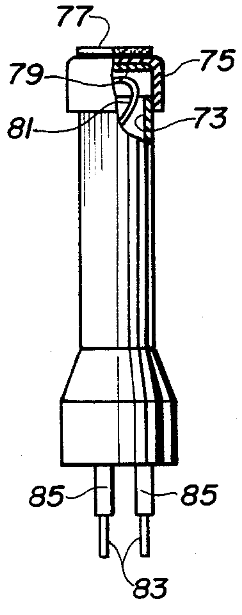

FIG. 6 shows a fourth embodiment of the novel oxide cathode comprising a one-mil-thick nichrome sleeve 73 and a two-mil-thick cap 75 of nickel welded to one end of the sleeve 73. The sleeve 73 and the cap 75 have compositions similar to the sleeve and cap of the first embodiment. An oxide layer 77 resides on the outer surface of the cap 75. The inner surface of the endwall of the cap 75 carries a layer 79 of chromium metal. A resistance heater 81 resides inside the sleeve 73 with the legs 83 thereof extending out of the open end of the sleeve 73. An insulating layer 85 is present on the heater.

What is claimed is:

1. In a vacuum electron tube, an oxide cathode comprising a metal substrate a sleeve, means within said sleeve for heating said substrate to its operating temperature and a layer consisting essentially of alkaline-earth-metal oxide on said substrate,
   wherein said substrate is essentially free from silicon and contains operative concentrations greater than 1.0 weight percent of chromium metal for progressively reducing said oxide to yield alkaline earth metal.

2. The oxide cathode defined in claim 1 wherein said chromium is present in said substrate an concentrations in the range of 5 to 20 weight percent.

3. The oxide cathode defined in claim 1 wherein said chromium metal is present in said substrate in concentrations averaging about 6.0 weight percent.

4. The oxide cathode defined in claim 1 wherein said substrate is prepared by bonding together a metal base layer that is essentially free from both chromium and silicon to a metal auxiliary layer that contains substantial proportions of chromium metal and is free from silicon, coating the surface of said metal base layer with material that is thermally-decomposable to said oxide layer, and then heating said coated and bonded metal layers at temperatures at which operative proportions of chromium in said auxiliary layer progressively migrate into said base layer and said coating.

5. The oxide cathode defined in claim 4 wherein said coated and bonded metal layers are heated at temperatures in the range of 1030° to 1080° K. for at least 50 hours.

6. The oxide cathode defined in claim 1 wherein said substrate contains operative proportions of at least one reducing agent in addition to said chromium metal.

7. The oxide cathode defined in claim 1 wherein said metal substrate consists essentially of a major proportion of nickel metal and a minor proportion of a plurality of metallic reducing agents including (a) said chromium metal and (b) at least one fast-acting metallic reducing agent for reducing said oxide layer, and said oxide layer includes barium oxide.

8. The oxide cathode defined in claim 7 wherein said one fast-acting metallic reducing agent is magnesium metal.

9. In a vacuum electron tube, a thermionic cathode comprising
   (a) a metal substrate having a major external surface,
   (b) a layer of electron-emissive material on said surface, said material including an oxide compound of barium as an essential ingredient,
   (c) a sleeve adjacent to said metal substrate,
   (d) and means within said sleeve for heating said substrate and layer at temperatures at which said layer is electron emissive,
   said metal substrate consisting essentially of a major proportion of nickel metal and a minor proportion greater than 1.0 weight percent of chromium metal as an essential reducing agent for progressively reducing said barium oxide to barium metal, said substrate being essentially free from silicon.

10. The cathode defined in claim 9 wherein said chromium metal was introduced into said substrate by thermal migration from a contiguous source of chromium.

11. The cathode defined in claim 10 wherein said contiguous source is a layer of chromium metal coated on a surface opposite said external surface.

12. The cathode defined in claim 10 wherein said contiguous source is a strip of nickel-chromium alloy bonded to a surface opposite said external surface.

13. A vacuum electron tube comprising an evacuated envelope having therein an indirectly-heated thermionic cathode, said cathode having been prepared by
   (1) providing a bimetal substrate comprising an inner layer consisting essentially of an alloy of nickel and chromium bonded to an outer layer consisting essentially of nickel metal, said inner and outer layers being free from silicon,
   (2) coating the surface of said outer layer with material consisting essentially of oxidic compounds of at least one of barium, strontium and calcium,
   (3) mounting said coated substrate in said envelope,
   (4) evacuating said envelope to a low gas pressure, and then
   (5) heating said substrate and coating at temperatures in the range of 1030° to 1080° K. for at least ten hours, whereby said coating of oxidic compound decomposes to form an oxide layer and chromium migrates into said outer layer.

* * * * *

UNITED STATES PATENT AND TRADEMARK OFFICE
CERTIFICATE OF CORRECTION

PATENT NO. : 4,904,896

DATED : February 27, 1990

INVENTOR(S) : Kenneth K. T. Chiang

It is certified that error appears in the above-identified patent and that said Letters Patent is hereby corrected as shown below:

| Patent | Application |
|---|---|
| Column 4, line 12, change "atoms" to --atmos.--. | Page 6, line 5. |
| Column 4, line 22, change "atoms" to --atmos--. | Page 6, line 14. |
| Column 4, line 39, after "weight" add --%--. | Page 6, lines 31-32. |
| Column 5, line 45, after "substrate" add --,--. | Page 9, line 4. |

Signed and Sealed this

Fifteenth Day of January, 1991

*Attest:*

HARRY F. MANBECK, JR.

*Attesting Officer*

*Commissioner of Patents and Trademarks*